UNITED STATES PATENT OFFICE 2,648,671

PREPARATION OF GUANAZOLE

John J. Roemer, Stamford, and Donald W. Kaiser, Old Greenwich, Conn., assignors to American Cyanamid Company, New York, N. Y., a corporation of Maine No Drawing. Application June 15, 1951, Serial No. 231,895

5 Claims. (Cl. 260—308)

The present invention relates to the preparation of guanazole, and more particularly to the preparation of this compound from dicyandiamide and certain hydrazine salts.

Prior to the present invention there was no way known to prepare guanazole from dicyandiamide and hydrazine in good yield. For example, when dicyandiamide and hydrazine monohydrochloride are heated in alcohol the yield of guanazole is poor (Pellizzari, Chemical Society, Journal Abstracts, vol. 65, 1, page 518, 1894). No improvement is obtained in the Pellizzari method (using alcohol as the solvent) if hydrazine dihydrochloride is used instead of the monohydrochloride. It is also known that dicyandiamide and hydrazine hydrate reacted in water give poor results (Simons, U. S. Patent No. 2,456,090). While it is known that phenylhydrazine monohydrochloride can be reacted with dicyandiamide in water to give a good yield of phenylguanazole (Journal für Praktische Chemie, Series 2, vol. 84, page 409, 1911), substitution of hydrazine monohydrochloride for phenylhydrazine monohydrochloride in the same aqueous reaction fails to give recoverable guanazole.

The surprising discovery has now been made that when dicyandiamide is reacted with a hydrazine dihydrohalide in water, a substantially theoretical yield of guanazole is obtained. In fact, so far as is now known, this particular combination of hydrazine compound and solvent is the only one that will give high yields of guanazole with dicyandiamide.

The following example illustrates without limiting the invention.

Example

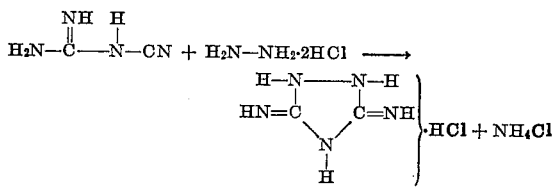

Dicyandiamide (1.0 mol), hydrazine dihydrochloride (1.0 mol), and water (250 cc.) were placed in a one liter 3-necked flask equipped with a stirrer and thermometer. The contents of the flask were warmed up to 30° C. on a steam bath which was then turned off. The temperature rose spontaneously and was held at 45°–50° C. by intermittent cooling during the first half hour. Steam was then applied intermittently and the temperature was held at 45°–50° C. for a total reaction time of two hours. The clear solution was cooled and a solution of 2 mols of sodium hydroxide in 200 cc. was added to neutralize the guanazole hydrochloride and to convert the $NH_4Cl$ to sodium chloride, which is less soluble in methanol. The ammoniacal smelling solution was then evaporated to dryness under reduced pressure. (Other bases, such as KOH, $Na_2CO_3$, and the like can also be used as neutralizers.) The dry residue was then extracted with 1.5 liters of boiling methanol. The alcohol solution on evaporation to a low volume and filtering gave 97 g. (97% yield) of guanazole crystals.

The ratio of dicyandiamide to hydrazine salt is preferably equimolar; however, either reactant can be used in considerable excess over the other (e. g., 1–10:1–10 respectively) without effecting the excellent yield. There is no advantage in using an excess, however, as such excess does not contribute to an increased yield and must be recovered or wasted. If for any reason an excess of dicyandiamide is used over the hydrazine salt, and a high yield of guanazole is desired, it is desirable not to permit the reaction to proceed more than two or three hours at the preferred temperature of about 50° C., as after this time such excess of dicyandiamide slowly converts some of the guanazole initially formed to guanazoguanazole. Of course, if it is desired to make both guanazole and guanazoguanazole, an excess of dicyandiamide can be used deliberately, e. g., 1.1–1.9 mols/mol of hydrazine salt, while deliberately extending the reaction time to 4–8 hours. Such byproduct guanazoguanazole is substantially insoluble in water and can be filtered at the end of the reaction. The filtrate can then be worked up to recover guanazole as in the example, and the total yield of guanazole, including that converted to guanazoguanazole, is still nearly theoretical.

The time of reaction is substantially immaterial when using equimolar amounts of reactants or an excess of hydrazine salt. At a reaction temperature of about 50° C. a fair yield of guanazole hydrochloride is obtained in ½–1 hour, and the reaction is substantially complete in two hours. At higher temperatures, e. g., 80–100° C., the reaction is complete in a few minutes.

The amount of water should be at least sufficient to provide a stirrable slurry, but can be much greater. Considerable excess of water can be used, but there is no advantage in this, owing to the fact that all water must eventually be separated from the guanazole produced.

Temperatures lower than 50° C., e. g., 40° C. can be used, in which event the reaction time is preferably approximately double that of the example. The reaction can also be carried out at temperatures as high as 100° C. with correspondingly reduced times of reaction. When using higher temperatures, e. g., 80°–100° C., and/or when using large quantities of reactants, it is preferred to add the dicyandiamide portionwise to the aqueous solution of hydrazine dihydrohalide in order to control the exotherm and to inhibit formation of byproducts.

Instead of the dihydrochloride, hydrazine dihydrobromide can also be used.

While the invention has been described with particular reference to specific embodiments, it is to be understood that it is not to be limited thereto but is to be construed broadly and restricted solely by the scope of the appended claims.

We claim:

1. The method of preparing a guanazole hydrohalide which comprises heating dicyandiamide and a member of the group consisting of hydrazine dihydrochloride and hydrazine dihydrobromide in aqueous solution at a temperature in the range of about 30°–100° C.

2. The method according to claim 1 in which the dihydrohalide is dihydrochloride.

3. The method according to claim 2 in which the reactants are in substantially equimolar amounts.

4. The method according to claim 3 in which the reaction temperature is within the range 30° to 50° C.

5. The method of preparing guanazole hydrochloride which comprises adding dicyandiamide portionwise to an aqueous solution of hydrazine dihydrochloride maintained at 80° to 100° C. the mol ratio of hydrazine dihydrochloride:total dicyandiamide added being at least 1.

JOHN J. ROEMER.
DONALD W. KAISER.

References Cited in the file of this patent

UNITED STATES PATENTS

| Number | Name | Date |
|---|---|---|
| 2,456,090 | Simons | Dec. 14, 1948 |
| 2,480,514 | Simons | Aug. 30, 1949 |

OTHER REFERENCES

Hoffman et al., C. A. vol. 7, January–April 1913, pp. 478–479.